Jan. 13, 1970   I. E. JOHNSON   3,489,509
PROCESS FOR RECOVERY OF CESIUM COMPOUNDS OF HIGH PURITY
Filed May 18, 1967
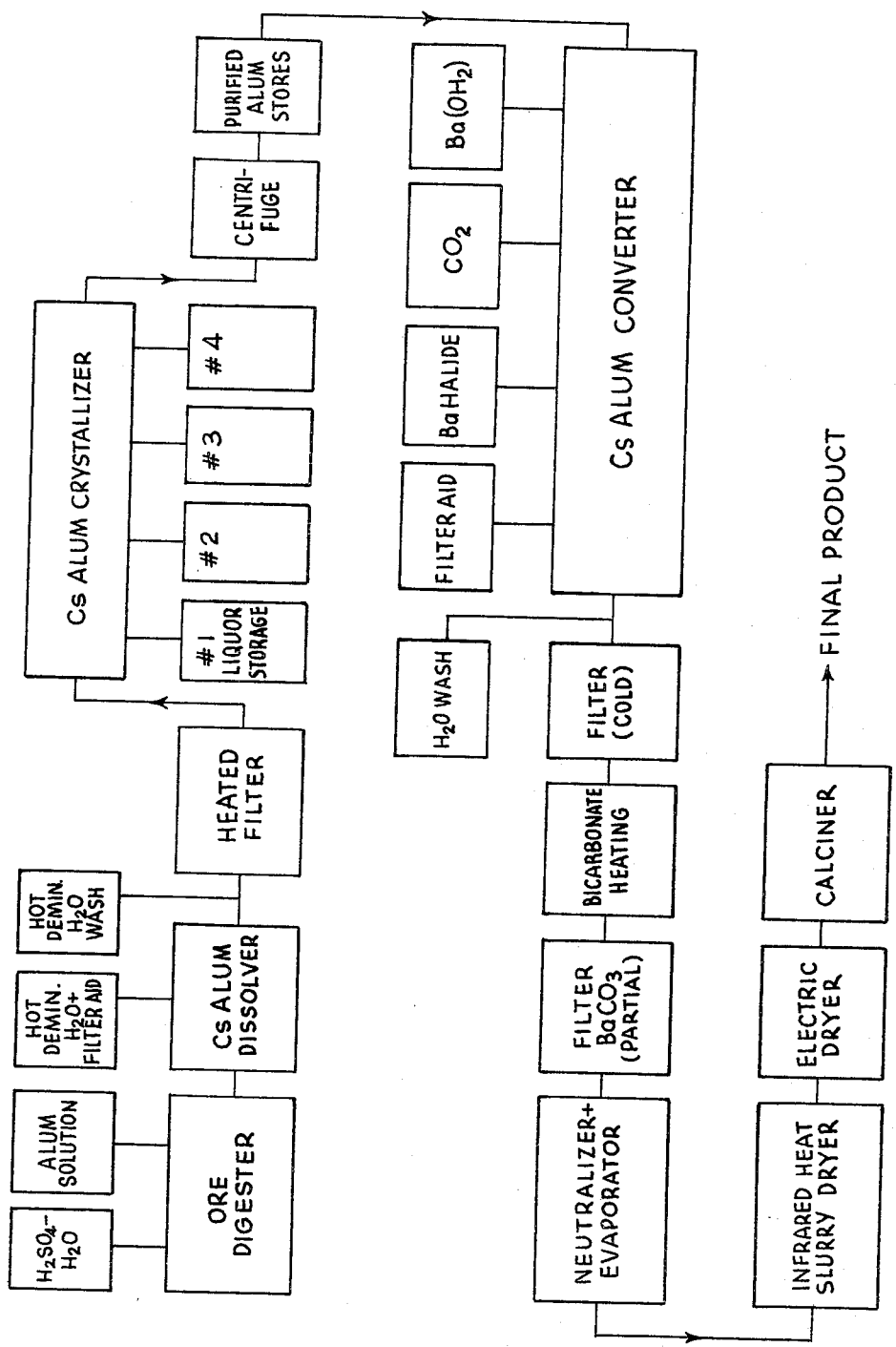
IRWIN E. JOHNSON, INVENTOR
BY Walter J. Monacelli
ATTORNEY United States Patent Office 3,489,509
Patented Jan. 13, 1970

3,489,509
PROCESS FOR RECOVERY OF CESIUM
COMPOUNDS OF HIGH PURITY
Irwin E. Johnson, Parma Heights, Ohio, assignor to Kewanee Oil Company, Bryn Mawr, Pa., a corporation of Delaware
Filed May 18, 1967, Ser. No. 639,366
Int. Cl. C01d 11/04; C07c 53/06, 53/10
U.S. Cl. 23—89                10 Claims

ABSTRACT OF THE DISCLOSURE

This invention relates to a process for the recovery of a highly pure halide, formate, acetate or nitrate from cesium alum.

SUMMARY OF THE INVENTION

This invention comprises a process for the recovery of a cesium halide, formate, acetate or nitrate of improved purity. With cesium halides this is particularly important with regard to sulfate impurity which is harmful in the use of cesium halide in single crystal growth from a melt. The production of cesium halides, formate and acetate suitable for density gradient work is also important. In like manner the nitrate may also be recovered in pure form. In the process of this invention, a solution of cesium alum is reacted directly with $Ba(OH)_2$ in the absence of calcium, followed by carbon dioxide reaction and subsequent reaction with approximately a stoichiometric amount, based on the cesium, of barium halide, barium acetate or barium formate to produce an ultimate product having a much lower sulfate content than previously obtained by other processes, the cesium salt containing less than 15, and very often even less than 10 parts per million of sulfate. In addition to making the pure product, this process facilitates the filtering operation and makes it possible to avoid one of the filtering steps necessary in the prior art processes.

This invention relates to a process for the recovery of cesium compounds from pollucite and other cesium ores in more highly purified form. More specifically, it relates to the process of recovering cesium compounds in halide or other specified form from cesium alum with a much lower amount of sulfate impurity. More specifically, it relates to an improved process for recovering cesium halide, etc., in highly pure form from the cesium alum produced by the sulfuric acid extraction of pollucite or other cesium ore.

Processes have been developed for the recovery of cesium values from pollucite ore or cesium aluminum silicate ore. According to prior art techniques, the ore is converted to cesium alum and purified by recrystallization in the form of $CsAl(SO_4)_2 \cdot 12H_2O$. For example, U.S. Patent 3,207,571 shows that this cesium alum has been converted to CsOH and $Cs_2CO_3$ by various reactions in which the cesium alum is initially added to a hot slurry of calcium hydroxide to yield a solution of cesium sulfate from which calcium sulfate hydrate and aluminum hydrate are precipitated. In subsequent steps, the patentee attempts to remove the sulfate by the addition of $Ba(OH)_2$ and also the addition of carbon dioxide. However, it has been found that the cesium compounds produced by this process are not sufficiently free of sulfate for various uses in which a substantially pure cesium compound is required.

For example, in the growth of single crystals from cesium halides, such as the iodide, bromide and chloride, it is essential that there be no more than a few parts per million of sulfate present. Likewise, for density gradient purposes, where cesium chloride, cesium formate and cesium acetate are used, it is necessary that such compounds be in a highly purified state.

It has been found that the use of calcium in the initial stages of recovery of the cesium from a solution of cesium alum, regardless of whether barium is subsequently used in the removal of sulfate, results in ultimate products which have more impurities than can be tolerated for the above-mentioned crystal growing and density gradient purposes. It has not been determined whether this is due to the fact that calcium in the various solutions prevents a more complete removal of the sulfate, or whether it is the result of impurities, such as magnesium and other alkalis which are introduced with the calcium oxide or slaked lime used in the initial precipitation. Moreover, it has been found that there are certain filtration difficulties occasioned by the use of calcium which are not encountered if calcium compounds are avoided in the processing steps. In any case, it has been found that purer products, that is having only a few parts per million of sulfate in the ultimate product, and more easily filtered precipitates are obtained when cesium alum is converted to ultimate products in accordance with the process of this invention.

In accordance with this invention, it has been found that cesium halides, acetate, formate and nitrate of greater purity can be produced by the direct reaction of cesium alum with barium hydroxide in the absence of calcium. This process is capable of yielding such ultimate products having as little as a few parts per million of sulfate. Moreover, the omission of calcium in the processing steps avoids an additional filtration step and it is now possible to remove the sulfate more completely by the direct use of barium hydroxide.

According to the process of this invention, not only is less sulfate retained in the various solutions but the ultimate step of converting the cesium to the halide, acetate, formate or nitrate form by the addition of the corresponding barium compound further reduces the concentration of sulfate by the mass action principle in the solution from which the ultimate cesium compound is to be recovered. This high concentration of barium in the final step of converting the cesium to the desired form, reduces the sulfate content even below the amount that would normally be retained as barium sulfate. It is also found advantageous to have the pH of the ultimate solution in the range of 6.5–8.5 to further reduce the solubility of sulfate. In the addition of the barium halide or acetate, formate or nitrate, it is desirable to add this barium compound in approximately the stoichiometric amount to form the corresponding cesium compound.

The chemical reactions taking place during the course of the process steps of this invention are as follows:

(1) $2CsAl(SO_4)_2 + 4Ba(OH)_2 \rightarrow 2CsOH + 4BaSO_4 + Al_2O_3 \cdot 3H_2O$ (2) $2CsOH + CO_2 \rightarrow Cs_2CO_3 + H_2O$ (3) $Cs_2CO_3 + H_2O + CO_2 \rightarrow 2CsHCO_3$ (4) $2CsHCO_3 + BaCl_2 \rightarrow 2CsCl + Ba(HCO_3)_2$ (5) $Ba(HCO_3)_2 \xrightarrow{\text{Heat}} BaCO_3 + CO_2 + H_2O$ In the course of reaction (2), excess $Ba(OH)_2$ is converted to $BaCO_3$ which is precipitated with the $BaSO_4$ and $Al_2O_3 \cdot 3H_2O$. However, if there is any $Ba(HCO_3)_2$ formed, which is more soluble, this is decomposed by heating to give off $CO_2$ and the more insoluble $BaCO_3$. Where the ultimate products are to be used for scintillation or optical purposes, it is desirable that these be essentially free of impurities including barium.

The accompanying drawing is a flow sheet outlining the various steps and reagents used in recovering the cesium values from the cesium ore and thereafter purifying it in accordance with the process of this invention.

The invention is best illustrated by the following examples. These examples are given merely for illustrative purposes and are not intended to restrict the scope of the invention nor the manner in which it may be practiced. Parts and percentages, unless specifically indicated otherwise, are by weight.

Example I 450 grams of cesium alum is partially dissolved in 1.6 liters of hot distilled water and 530 grams of dry $Ba(OH)_2 \cdot 9H_2O$ crystals are added. The charge is heated to 90° C. and held for 40 minutes at 90–98° C. Then it is cooled to about 20° C., after which $CO_2$ is passed through with agitation for about 2 hours. The pH is tested periodically and the $CO_2$ flow is stopped when the pH is in the range of 6.5 to about 8. There is then added 330 ml. of aqueous solution containing 128 grams of $BaI_2$. This is mixed well and the pH drops to 7. The product is allowed to stand overnight. Then 40 grams of a filter aid is added and the product is filtered. The precipitate is washed with cold distilled water. The total filtrate solution, including wash water, is approximately 2.6 liters. The filtrate is heated to convert any barium bicarbonate present in the solution to barium carbonate by driving off $CO_2$. This reduces the soluble barium content. If any barium carbonate is precipitated as a result of this heating, it is removed by repeating the filtration. The cesium iodide is recovered by evaporating the filtrate to dryness. The spectroanalysis of the cesium iodide product shows no detectable amount of barium and no detectable amount of nickel, which materials are desirably absent when the product is to be used for scintillation or optical purposes. Spectroanalysis also shows that there are 11 parts per million of sulfate. For crystal growth purposes, it is desirable that there be no more than about 10–15, preferably even fewer parts per million of sulfate.

Example II

The procedure of Example I is repeated a number of times with equally satisfactory results using individually in place of the barium iodide an equivalent amount of barium chloride, barium bromide, barium nitrate, barium acetate and barium formate respectively.

The flow sheet of the accompanying drawing illustrates the procedure used in processing the cesium ore through a number of steps to produce the cesium alum and thereafter through the steps of the process of this invention to produce the highly purified cesium compounds described above. The ore is processed in accordance with the prior art, preferably in a finely divided state so that it can be digested by treatment with sulfuric acid. It is preferred to add ammonium alum solution or powdered alumina to increase thereby the yield of recovered cesium alum. However, such addition is optional. The product of this digestion is then passed into the cesium alum dissolver where hot demineralized water and filter aids are added. The resultant solution is passed into a heated filter and the filter cake washed with hot demineralized water. The filtrate and wash water are passed into the cesium alum crystallizer where a number of crystallizations are performed to obtain the desired purity of cesium alum. This purified cesium alum is then centrifuged and placed in storage until the appropriate time for forwarding to the cesium alum converter.

The cesium alum converter has connected to it a number of feed lines from a $Ba(OH)_2$ supply, a carbon dioxide supply and a barium halide, formate, acetate or nitrate supply which can be fed into the cesium alum converter in the order named. Also connected to the converter is a filter aid supply. After the various processing reagents have been added as indicated, the reaction mass is cooled and passed to the filter. The filter cake is washed with demineralized or distilled water and the acid filtrate and washings passed to a heating tank where any barium bicarbonate that may be present is decomposed to barium carbonate which is precipitated and removed upon passing the resulting liquid into the adjoining filter. The filtrate is the sent to the neutralizer and evaporator from which it is passed to the infrared heat slurry drier, then to the electric drier and calciner.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for the treatment of cesium aluminum sulfate to recover a cesium compound relatively free from sulfate and comprising the steps of:
    (a) reacting a solution of cesium aluminum sulfate with barium hydroxide, thereby precipitating barium sulfate and aluminum hydroxide therefrom;
    (b) adding carbon dioxide to the resulting reaction mass of step (a) until a pH of no more than 8.5 is obtained;
    (c) reacting the resultant solution with a barium compound selected from the class consisting of the chloride, iodide, bromide, formate, acetate and nitrate in approximately the stoichiometric amount based on the amount of cesium compound in a said solution;
    (d) separating the resultant solution from the material precipitated therefrom; and
    (e) recovering the cesium compound from said solution.

2. The process of claim 1 in which said recovered cesium compound has less than 15 parts per million of sulfate therein.

3. The process of claim 1 in which said separation is effected by filtration.

4. The process of claim 3 in which the filtrate from said filtration is evaporated to recover the cesium compound therefrom.

5. The process of claim 1 in which subsequent to the addition of said carbon dioxide, the reaction mass is heated at a temperature sufficient to decompose barium bicarbonate to barium carbonate.

6. The process of claim 1 in which said barium compound is barium iodide.

7. The process of claim 1 in which said barium compound is barium chloride.

8. The process of claim 1 in which said barium compound is barium formate.

9. The process of claim 1 in which said barium compound is barium bromide.

10. The process of claim 1 in which said barium compound is barium acetate.

References Cited

UNITED STATES PATENTS 3,130,010  4/1964  Moolenaar et al. ____ 23—89 XR
3,207,571  9/1965  Berthold _____ 23—63 XR EDWARD STERN, Primary Examiner U.S. Cl. X.R.

23—63, 64, 66, 102, 141, 184; 260—541, 542